United States Patent [19]

Labinger et al.

[11] Patent Number: 5,175,064
[45] Date of Patent: Dec. 29, 1992

[54] FUEL CELLS BASED ON OXIDATION OF ORGANICS OVER METAL EXCHANGED β-ALUMINAS

[75] Inventors: Jay A. Labinger, Claremont, Calif.; Edmund Fowles, Liverpool, United Kingdom

[73] Assignee: California Institute of Technology, Pasadena, Calif.

[21] Appl. No.: 698,491

[22] Filed: May 9, 1991

[51] Int. Cl.⁵ .............................. H01M 6/20
[52] U.S. Cl. ...................... 429/40; 429/30; 429/193; 502/11; 502/101
[58] Field of Search ............ 429/30, 40, 193; 502/11, 101

[56] References Cited

U.S. PATENT DOCUMENTS

| 4,749,634 | 6/1988 | Sammells | 429/193 |
| 4,997,725 | 3/1991 | Pujare et al. | 429/40 |

Primary Examiner—Olik Chaudhuri
Assistant Examiner—M. Nuzzolillo
Attorney, Agent, or Firm—Joseph E. Mueth

[57] ABSTRACT

Novel fuel cells based on the fast ion conductors, transition metal exchanged β″-alumina and other similar metals capable of undergoing a change in oxidation state, which are used as catalysts for the deep oxidation of hydrocarbon-type fuels.

16 Claims, 1 Drawing Sheet

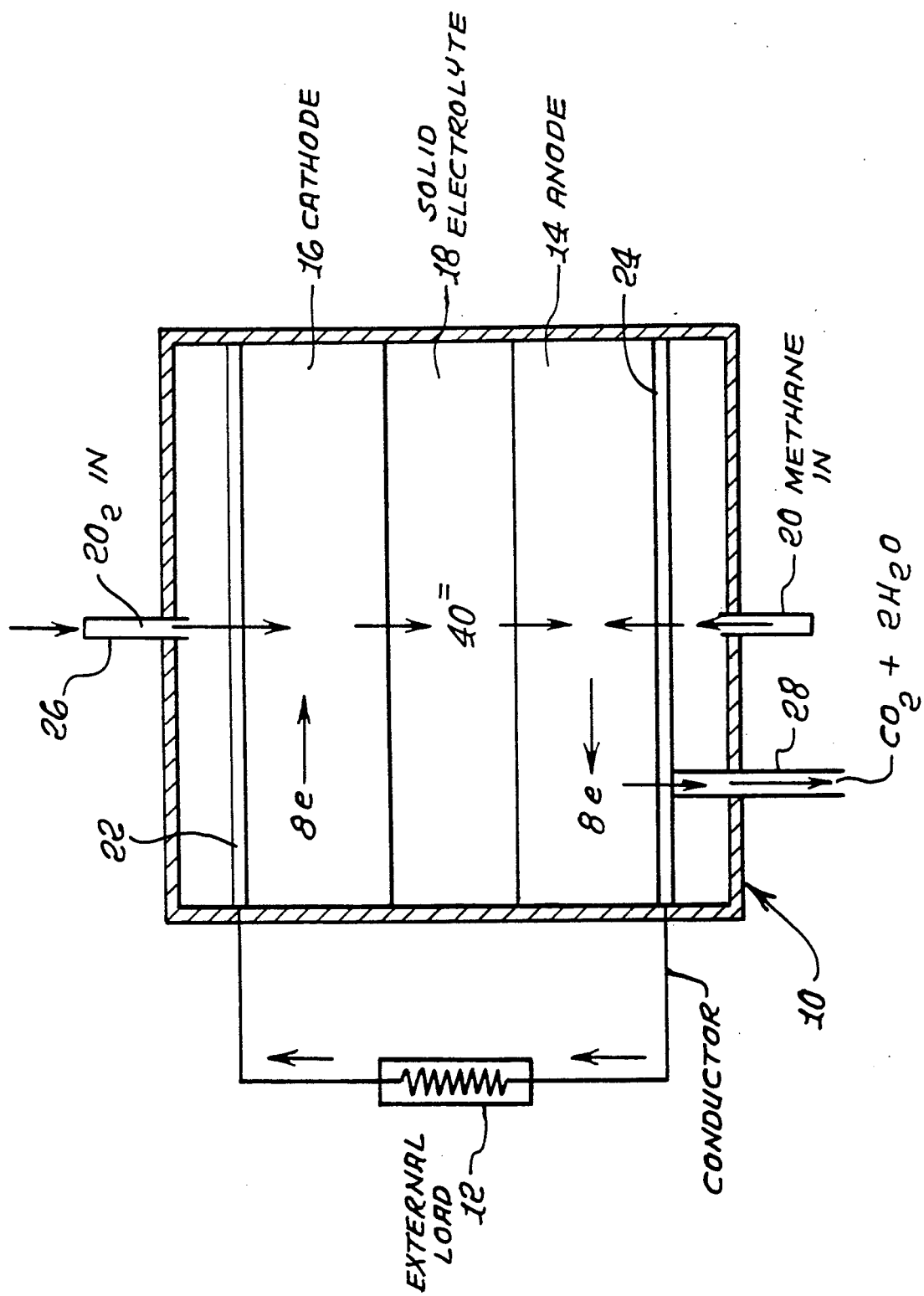

FUEL CELLS BASED ON OXIDATION OF ORGANICS OVER METAL EXCHANGED β-ALUMINAS

This invention was made with Government support under Grant No. N0014-89-J-3198 awarded by the Department of the Navy. The Government has certain rights in the invention.

BACKGROUND OF THE INVENTION

The deep oxidation of $CH_4$ and other organics to $CO_2$ was studied widely in the 1960s and 1970s when it was hoped that a cheaper alternative to $Pt/Al_2O_3$ could be found as a catalyst for the total combustion of hydrocarbons and CO in automobile exhausts. However, base transition metal oxides were found to be less active and less robust than $Pt/Al_2O_3$. Catalysts for the Control of Automotive Pollutants (Advances in Chemistry Series 143); McEvoy, J.D., Ed.; American Chemical Society: Washington, D.C., 1974. $\beta''$-alumina which was not ion exchanged has been proposed for use in hydrogen based fuel cells "Fuel Cell Handbook", Van Nostrand and Reinholt, (1989), pp 308-10. The anodic oxidation of $CH_4$ in $CH_4$-air fuel cells have not been commercially practical because suitable electrocatalysts are unavailable. Most fuel cells utilizing $CH_4$ use the steam reforming reaction (1) to pre-form more $$CH_4 + H_2O \rightarrow CO + 3\,H_2$$

easily oxidizable CO and $H_2$. Appleby, A. J.; Foulkes, F. R. Fuel Cell Handbook; Van Nostrand Reinholt: New York, 1989. Recently, Steele and co-workers used an undisclosed electronically conducting metal oxide (Pt was found to be a poor catalyst) for the anodic oxidation of $CH_4$ in a $CH_4$/He - air cell with a $Y_2O_3$ stabilized $ZrO_2$ electrolyte at 800 C. Steele, B. C. H.; Kelly, I.; Middleton, H.; Rudkin, R. Solid State Ionics 1988, 28-30, 1547. The steam reforming reaction greatly decreases the efficiency and increases the complexity of the cell. Of course, for use in a fuel cell the catalyst must efficiently oxidize methane in the absence of gas-phase oxygen. Other fuel cells operating on hydrogen employ phosphoric acid, molten carbonates or alkaline electrolytes which are liquids. In general, prior art fuel cells based on methane and other organics involve high operating temperatures and/or the use of hydrogen which presents problems of safety and containment.

A class of metal oxides which we have found to be of significant benefit in the direct deep oxidation of methane and other organic in fuel cells are the transition metal exchanged $\beta''$-aluminas. These metal oxide compositions are discussed in Barrie, J. D.; Dunn, B.; Stafsudd, O. M.; Farrington, G. C. Solid State Ionics 1986, 18-19, 677. These materials are unique in being the only oxides that are fast conductors of transition metal ions. The high mobility of these ions is believed to be due to the unusual structure of $\beta''$-alumina. It consists of layers of close-packed Al and O ions, called "spinel blocks", which are bridged by "columnar oxygens". The $\beta''$-alumina phase is generally stabilized by substituting a few % of the Al cations by Mg or Li. We have discovered that the ionic conductivity of such a catalyst appears to be useful in a fuel cell based on methane and other organics. While not bound by any theory, this may be due to the oxo-transition metal which can effectively "drag" $O^{2-}$ through the conduction channels. No reports of catalytic studies on any such materials have appeared. The present invention pertains to findings applicable to the reactivity of transition metal exchanged $\beta''$-aluminas toward methane and other organics. The fuel cells of the present invention do not rely upon the presence of hydrogen, operate at relatively low temperatures, and are all solid. Hence, they are particularly adapted to be portable and are not prone to contamination.

SUMMARY OF THE INVENTION

Briefly, the present invention comprises novel fuel cells containing organic, essentially hydrocarbons as the expendable component, an anode, a cathode, and an electrolyte, all of which are solids, and a transition metal exchanged $\beta''$- alumina or after similar metal capable of undergoing a change in oxidation state as the catalyst for the expendable component.

The transition metal exchanged $\beta''$-aluminas may serve as the anode, cathode, and/or electrolyte in any electrolytically compatible array of transition metal exchanged $\beta''$-aluminas. Thus, the invention includes fuel cells which in one or the other electrode or the electrolyte is a conventional material.

The preferred expendable component is methane. However, the invention is applicable to organics which are hydrocarbons or essentially hydrocarbons such as the alkanes (ethane, propane, butane, pentane, etc.); alkanols such as methanol and ethanol and the like. For purposes of this invention, the alkanols are deemed to be essentially hydrocarbon.

It is an object of this invention to provide a novel fuel cell.

It is a further object of this invention to provide a novel fuel cell based on essentially hydrocarbon organic components.

It is a further object of this invention to provide a solid fuel cell which does not depend on hydrogen and being operable at relatively low temperatures, viz, on the order of 400°-500 degrees C.

These and other objects and advantages of this invention will be apparent from the more detailed description which follows, taken together with the accompanying drawing.

BRIEF DESCRIPTION OF THE DRAWING

FIG. 1 shows an embodiment of the electrochemical reaction of the fuel cell of this invention.

DESCRIPTION OF THE PREFERRED EMBODIMENTS

The approach is to react Na $\beta''$-alumina with a transition metal halide to give the transition metal exchanged $\beta''$-alumina. By this reaction, the transition metal replaces some of the sodium ions in the alumina.

This can then be oxidized by air to give a metal oxo-$\beta''$-alumina, which oxidizes $CH_4$ and gives back the original transition metal $\beta''$-alumina. Alternatively, if air oxidation does not generate a metal oxo species, the material can oxidize $CH_4$ with loss of oxygen atoms from the spinal blocks or the column positions. All the catalysts used herein were prepared by this route.

In a fuel cell, the pre-treatment with oxygen is normally not required since oxygen is continuously fed into the fuel cell to those components containing the transition metal exchanged $\beta''$-alumina.

Seven transition metal exchanged $\beta''$-aluminas were prepared by reacting polycrystalline Li stabilized Na $\beta''$-alumina with a molten or volatile metal halide. Three of these—Mn(II), Co(II) and Cr(III)—have been prepared previously by other workers. The other examples—Fe(II), Fe(III), Cu(II) and Cr(II)—have not been reported before. Typically, powdered Na $\beta''$-alumina and the transition metal halide were heated together in an evacuated quartz flask for 1-7 days at 550°-750° C. The exchanged $\beta''$-alumina was isolated by sonicating the mixture in water until all the metal halide had dissolved. The isomorphs were characterized by X-ray powder diffraction, and by elemental analysis for Na, transition metal, and halide. Additionally, the two Fe exchanged $\beta''$-aluminas were characterized by $^{57}$Fe Mossbauer spectroscopy. Table I gives the experimental conditions and % exchange for some of the materials prepared.

X-ray powder diffraction showed that the exchanged materials maintained the $\beta''$-alumina structure.

The degree to which Na had been replaced by transition metal was estimated by elemental analysis. For most samples the Na and transition metal analyses gave similar values for the percentage exchange.

620° C. for 21 hours. It was then cooled slowly in the furnace, broken open, and the mixture was sonicated in water for about 10 hours until all the FeCl$_2$ had dissolved. The solid was washed first with water, then quickly with 1 cm$^3$ of M HCl to dissolve Fe(OH)2, followed immediately with more water to remove the acid. The Fe(II)/$\beta''$-alumina was dried at 100° C. under vacuum to give a grey powder. It is not oxidized by air at room temperature.

Elemental analysis: Fe 4.93% (corresponds to 62 exchange); Na 2.64% (corresponds to 60% exchange); Cl 0.032%.

The average value for exchange of 61% was used in Table I.

The other transition metal exchanged $\beta''$-aluminas were prepared similarly, except that they were not washed with acid. The conditions for exchange are given in Table I. An inert atmosphere was only necessary in the work-up of the Fe(II) and Cr(II) isomorphs.

Elemental analyses were carried out. Powder X-ray diffraction patterns were obtained on a Scintag PAD V diffractometer using Cu K radiation.

TABLE I

Preparation and Elemental Analysis of Transition Metal Exchanged $\beta''$-Aluminas

| Transition metal exchanged | Salt used | Ratio of transition metal halide to Na by mole | Exchange time (h) | Temperature or temperature range during exchange °C. | % weight of transition metal in product | % exchange[a] | % of transition metal outside conduction channels[b] | color |
|---|---|---|---|---|---|---|---|---|
| Fe(II) sample A | FeCl$_2$ | 19 | 104 | 615-640 | 8.7 | 85 | 21 | gray |
| Fe(II) sample B | FeCl$_2$ | 11 | 98 | 590-630 | 6.3 | 80 | 0 | brown[c] |
| Fe(II) sample C | FeCl$_2$ | 11 | 21 | 620 | 4.8 | 61 | 0 | gray |
| Fe(III) | FeCl$_3$ | 7 | 72 | 555 | 5.9 | 63 | 43[d] | pale gray-brown |
| Mn(II) sample A | MnCl$_2$ | 7 | 120 | 610-640 | 4.6 | 60 | 0 | brown |
| Mn(II) sample B | MnCl$_2$ | 41[e] | 32[e] | 610-660 | 10.7 | 93 | 34 | brown |
| Cr(II) | CrCl$_2$ | 11 | 73 | 560 | 5.0 | 68 | 0 | dark blue-green |
| Cr(III) | CrCl$_3$ | 13 | 12 | 760 | 2.2 | 44 | 0 | pale green |
| Co(II) | CoBr$_2$ | 10 | 160 | 660 | 6.4 | 80 | 0 | blue |

[a] Calculated from Na analysis. For samples in which there was thought to be no transition metal outside the conduction channels the Na and transition metal analyses gave slightly different values for the % exchange. These were within about 10% of each other and the average value is given here.
[b] Calculated by subtracting the amount of transition metal expected in the conduction channel (from the Na analysis) from the total transition metal found in the sample.
[c] Particles were brown because they were coated with a little Fe$_2$O$_3$ formed during work-up.
[d] X-ray diffraction and Mossbauer spectroscopy showed that this was present as Fe$_2$O$_3$.
[e] Two separate exchanges were carried out. These figures are the total amount of Mn used and the total reaction time.

The preparation of transition metal exchanged $\beta''$-aluminas is now discussed.

Preparations of exchanged polycrystalline $\beta''$-aluminas are based on those used for single crystals, Sattarr, S.; Ghosal, B.; Underwood, M. L.; Mertway, H.; Saltsburg, M. A.; Frydrych, W. S.; Rohrer, G. S.; Farrington, G. C. J.Solid State Chem. 1986, 65, 231. The procedure for making Fe(II) $\beta''$-alumina (sample C in Table I) was as follows:

Broken tubes of polycrystalline Li stabilized Na $\beta''$-alumina ("Betalyte": Li$_{0.30}$Na$_{1.72}$Al$_{10.66}$O$_{17}$, from Ceramatec Corp., Salt Lake City, Utah) were ground in a ball mill for 5 minutes, particles larger than 80 mesh were discarded, and the remainder was dried at 650° C. in air. The following manipulations were carried out in argon. Dried Na $\beta''$-alumina (2.33g, 6.67 mmol of Na) and anhydrous FeCl$_2$ (9.02 g, 71.2 mmol) were sealed in an evacuated quartz flask that had been previously flamed out. The flask was shaken well to ensure thorough mixing, and heated at

Catalysis studies

The apparatus used for testing catalysts was similar to that described by Labinger and Ott, Labinger, J. A.; Ott. K. C. J. Phys. Chem. 1987, 91, 2682. Catalytic oxidation of CH$_4$ was tested in cycling "redox" mode, in which air and CH$_4$ are passed alternately over the catalyst (as opposed to "cofeed" mode, in which a mixture of CH$_4$ and air is used).

A ¼" I.D. all alumina reactor inside a tube furnace was loaded with 0.6-0.8 g of catalyst. An alumina sheathed thermocouple was inserted into the bed at each end and the furnace was controlled to maintain the temperature at the two points to within 2° C. of each other. The flow rate of CH$_4$ was generally about 30 or 50 cm3/min, respectively, and was regulated using a Linde mass flow controller. The CH$_4$ or CO pressure in all experiments was 1 atm. The gas flowing through the reactor could be switched between air, Ar or CH$_4$ using air-actuated Valco valves. At each temperature the catalyst was oxidized in air for about 40 minutes and, after briefly purging with argon, the gas was switched to $CH_4$. The gases exiting the reactor were continuously bled into an Inficon IPC200 quadrupole mass spectrometer interfaced to a Hewlett-Packard Model 217 computer. The intensity of each of the following ions were monitored every few seconds: m/e 15 (for $CH_4$), 26 ($C_2H_4$), 28 (CO), 30 ($C_2H_6$) and 44 ($CO_2$). Ion intensities were converted to concentrations by calibrating with analyzed gas mixtures (Mattheson).

perature where oxidative coupling and deep oxidation compete. For the latter, the yield, conversion, and selectivity for oxidative coupling products is given at the point where the yield is highest. The last column of Table II gives the "oxidizing content" of the catalyst, that is, the total number of oxidizing equivalents utilizable (by integrating all oxidation products) under the reaction conditions. This parameter is a function of the proportion of transition metal sites that are active and the oxidation state changes they undergo during reduction.

TABLE II

Selected Data from the Reactions of Oxidized Transition Metal $\beta'''$-Aluminas with $CH_4$

| Transition metal exchanged (% by weight) | Deep oxidation to $CO_2{}^a$ Initial rate of oxidation ($cm^3$/min per g) | Deep oxidation and oxidative coupling[b] | | | | Oxidizing content (moles of e/mole of transition metal in %) |
|---|---|---|---|---|---|---|
| | | Initial rate of conversion ($cm^3$min per g) | Best yield during run (%) | Conversion at best yield (%) | Selectivity at best yield (%) | |
| Fe(II) sample A (8.7) | 300° C.: <0.0002<br>400° C.: 0.004<br>455° C.: 0.010<br>520° C.: 0.020<br>595° C.: 0.15 | 818° C.: 7.3<br>870° C.: 10.8 | 0.42<br>1.65 | 13.6<br>10.0 | 3.1<br>16.4 | 455° C.: 0.1<br>520° C.: 1.3<br>595° C.: 9.2<br>818° C.: 85<br>870° C.: 94 |
| Fe(II) sample B (6.3) | 412° C.: <0.0003<br>521° C.: 0.05<br>625° C.: 1.1<br>720° C.: 3.3<br>798° C.: 6.2 | 845° C.: 9.1<br>887° C.: 11.1 | 0.19<br>0.68 | 5.1<br>11.8 | 3.7<br>5.8 | 521° C.: 1.2<br>625° C.: 22.8<br>720° C.: 53<br>798° C.: 82<br>887° C.: 95 |
| Fe(II) sample C (4.9) | | 800° C.: 5.8 | 0.11 | 2.2 | 4.9 | 800° C.: 83 |
| Fe(III) (5.9) | 415° C.: <0.0003<br>491° C.: 0.062<br>580° C.: 0.85 | 795° C.: 15.4<br>853° C.: 16.6 | 0.28<br>0.61 | 10.5<br>15.7 | 2.7<br>3.0 | 603° C.: 40<br>799° C.: 100 |
| Mn(II) sample A (4.6)[c] | 252° C.: <0.0003<br>311° C.: 0.032<br>417° C.: 0.52<br>584° C.: 1.29 | 690° C.: 1.55<br>790° C.: 1.80<br>836° C.: 2.1<br>852° C.: 2.3 | 0.25<br>2.42<br>3.93<br>3.77 | 0.87<br>3.3<br>4.5<br>4.9 | 28.9<br>73.7<br>87.5<br>77.2 | 311° C.: 1.3<br>584° C.: 10.1<br>852° C.: 10.1 |
| Mn(II) sample B (10.7)[c] | 410° C.: 0.92<br>616° C.: 1.32 | 679° C.: 0.77<br>722° C.: 3.2<br>801° C.: 4.4<br>880° C.: 5.6 | 0.16<br>2.80<br>2.90<br>4.25 | 2.2<br>11.1<br>25<br>18.1 | 7.2<br>25.1<br>11.5<br>23.5 | 410° C.: 5.7<br>616° C.: 9.8<br>760° C.: 17.8<br>880° C.: 10.8 |
| Cr(II) (5.0)[c] | 304° C.: <0.0003<br>411° C.: 0.092<br>514° C.: 0.55[d]<br>609° C.: 0.46 | 807° C.: 0.16 | <0.002 | | | 514° C.: 2.2 |
| Cr(III) (2.2) | 382° C.: 0.010<br>493° C.: 0.13<br>602° C.: 0.27<br>795° C.: 0.43 | 875° C.: 0.27 | 0.10 | 0.11 | 91 | 493° C.: 3.9<br>795° C.: 5.2 |
| Co(II) (6.4) | 513° C.: <0.0003<br>723° C.: 0.17 | 900° C.: 0.38 | <0.002 | | | 723° C.: 1.6<br>900° C.: 1.5 |

[a] At these temperatures no oxidative coupling products were detected
[b] No oxidative coupling was observed below the lowest temperature indicated. Yields and selectivities are for $C_2H_4 + C_2H_6$. No higher hydrocarbons were detected.
[c] The activity and oxidizing content of this catalyst decreases from run to run. Figures given are based on the first run at this temperature.
[d] An example of deteriorating activity of this catalyst: after cycling at 807° C. and repeating the run at 514° C. this value was 0.055.

The following Examples serve to illustrate the invention.

Example I

Reactions of transition metal exchanged $\beta'''$-aluminas with methane

Reactions of methane with each of the six $\beta'''$-aluminas were tested in redox mode: at each temperature, beginning with the lowest. The catalyst was oxidized in air for about 40 min. After a brief purge with argon, $CH_4$ was passed over the catalyst and the gases exiting the reactor were analyzed by mass spectrometry. In all cases, there was no induction period and conversion decreased monotonically with time. Table II shows the rate of oxidation, expressed as $cm^3$ $CH_4$ reacted/g catalyst/min at the beginning of the introduction of methane, both a lower temperatures where only deep oxidation to $CO_2$ is observed, and at a higher tem- All materials catalyze deep oxidation of $CH_4$ to $CO_2$. The lowest temperature at which detectable oxidation occurred for any of the catalysts was 311° C., for Mn(II) $\beta'''$-alumina sample A. By contrast, no detectable oxidation was seen for Co(II) $\beta'''$-alumina below about 700° C. Some of the materials also catalyzed oxidative coupling to $C_2H_4$ and $C_2H_6$ and yield conversion, and selectivity data are given in Table II. The lowest temperature for which detectable oxidative coupling occurred was 670° C., for Mn(II) sample B. This catalyst also gave the highest yields of $C_2$ products of any of the $\beta'''$-aluminas studied: 4.25% at 800° C.

Two of the catalysts, Cr(II) and Co(II), gave no detectable methane coupling products.

The Fe catalysts can undergo many oxidation and reduction cycles without suffering degradation in their performance. There was no change in the X-ray diffraction pattern of Fe(II) $\beta''$-alumina sample B after 17 redox cycles. However, the activity and oxidizing content of the Mn(II) and Cr(II) $\beta''$-aluminas (and the Cr(III) $\beta''$-alumina above 800 C.) decreased from run to run. For this reason, the data in Table II is derived from the first run at each temperature.

Table III shows the results obtained with Cu (II) exchanged $\beta''$-aluminas.

TABLE III

Summary of methane oxidation activity with Cu (II) and Cu(I) exchanged $\beta''$-aluminas (the temperature used followed the order shown)

| Temperature (°C.) | Initial Rate cm$^3$/min/g | Ox. Content (mmol) | Max yield of C$_2$+ (%) |
|---|---|---|---|
| Cu (II) exchanged $\beta''$-alumina | | | |
| 400 | 0 | 0 | |
| 500 | 0.16 | 0.003 | |
| 602 | 0.85 | 0.013 | |
| 700 | 2.7* | 0.03* | |
| 800 | 4.3* | 0.06* | 0.17 |
| 855 | 4.5 | 0.08 | 0.50 |
| Cu (I) exchanged $\beta''$-alumina | | | |
| 300 | 0 | 0 | |
| 400 | non-zero | ? | |
| 500 | 1.35 | 0.059 | |
| 600 | 4.2 | 0.088 | |
| 701 | 3.2 | 0.089 | |
| 801 | 3.8 | 0.088 | 0.06 |
| 854 | 7 | 0.19* | 0.2 |
| 501 | 2.6 | 0.16 | |
| 503 | 3.1 | 0.18 | |
| 421 | 0.7 | 0.10 | |
| 351 | 0.08 | 0.023 | |
| 300 | 0 | 0 | |

Fe(II), Fe(III), Cr(II), Mn(II), Cr(III) and Cu(II) exchanged $\beta''$-aluminas are quite active for deep oxidation of methane under redox conditions. Compare the specific activity of Mn(II) $\beta''$-alumina sample A with that of Co$_3$O$_4$, the most active reported binary metal oxide catalyst for deep oxidation of CH$_4$. a) Golodets, G. I. *Heterogenous Catalytic Reactions Involving Molecular Oxygen* (Studies in Surface Science and Catalysts 15); Elsevier: Amsterdam, 1983, p. 437. b) Kummer, J. T. In Catalysts for the Control of Automotive Pollutants Advances in Chemistry Series 143), McEvoy, J. D., Ed.; American Chemical Society: Washington D.C., 1974, p. 178. c) Yao, Y.-F. Y. *J. Catal.* 1974, 33, 108. Assuming zero porosity for both samples, the surface areas of Mn(II) sample A and fresh Co$_3$O$_4$ were both estimated as 0.2±0.05 m$^2$/g from optical microscopy measurements. At 580° C., the initial specific activity of fresh Co$_3$O$_4$ for CH$_4$ oxidation (volume of CH$_4$ oxidized per min per m2 of catalyst) is 14 cm$^3$min$^{-1}$m$^{-2}$, and the initial specific activity of Mn(II) sample A at 584° C. is 13 cm$_3$min$_{-1}$m$_{-2}$. However, the transition metal loading of the $\beta''$-alumina (4.6%) is much lower than that of Co$_3$O$_4$(78.6%). The specific activities per mmole of transition metal are 1.1 cm$_3$min$^{-1}$m$^{-2}$mmole$^{-1}$ for Co$^3$O$_4$ and 15 cm$_3$min$^{-1}$m$^{-2}$mmole$^{-1}$ for Mn (II) sample A. These values suggest that the actual catalytic sites of Mn $\beta''$-alumina sample A are more active than those of Co$_3$O$_4$, and offers an indication that the weakly coordinating environment around the Mn ions leads to enhanced catalytic activity. The activity of this catalyst decreases with use. The greatest activities for deep oxidation above 700° C. were found with the Fe(II) and Fe(III) $\beta''$-aluminas; these catalysts do not deteriorate from run to run. Finally, the quantitative reduction of Fe(III) to Fe(II) in $\beta''$-alumina raises the interesting possibility of net oxygen ion conduction. This shows that these materials exhibit the ionic mobility needed as catalysts in fuel cell applications.

The application is applicable to $\beta''$-alumina exchanged with other metals capable of undergoing a change in oxidation state such as lead, tin, bismuth and antimony.

Example II

Using the transition metal exchanged $\beta''$-aluminas as prepared and described above, the following fuel cell configurations are now available. The fuel used is methane.

TABLE IV

| Anode Composition | Cathode Composition | Electrolyte |
|---|---|---|
| Fe(II) exchanged $\beta''$-alumina with metallic copper supporting grid | Fe(II) exchanged $\beta''$-alumina with metallic copper supporting grid | Fe(II) exchanged $\beta''$-alumina |

The electrochemical reactions which occur when the external circuit is completed are generally as follows:

at the Anode: 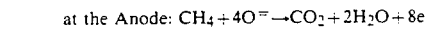 $CH_4 + 4O^= \rightarrow CO_2 + 2H_2O + 8e$ at the Cathode: 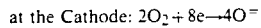 $2O_2 + 8e \rightarrow 4O^=$ Turning to the drawing one embodiment of the fuel cell of this invention is shown in sectional view. The fuel cell, generally 10, is connected by conductors to an external load 12. The anode 14 and cathode 16 are contained within the fuel cell. The fuel cell is provided with solid electrolyte 18. Methane can be introduced at the cathode via line 20. The methane is oxidized at the anode.

The use of the conductive grids 22 and 24 is optional, depending upon the composition chosen as the electrolyte. If the electrolyte is relatively low conducting compared to the anode and cathode where both are exchanged $\beta''$-aluminas, the grids are not required. If the electrolyte is an exchanged $\beta''$-alumina, then the exchanged $\beta''$-aluminas for the anode and cathode must be more highly conductive than the exchanged $\beta''$-alumina chosen for the electrolyte. Further, if the anode, cathode and electrolyte are all of the same exchanged $\beta''$-aluminas, then the use of highly conductive grids of copper or the like must be used.

Oxygen is introduced via line 26. The carbon dioxide and water formed is discharged via line 28. The cell operates at a temperature of about 500 degrees C.

Having fully described the invention, it is intended that it be limited solely by the lawful scope of the appended claims.

We claim:

1. A novel fuel cell utilizing essentially hydrocarbons as the fuel containing an anode, a cathode, and an electrolyte, all of which are solids, wherein at least the anode comprises a metal exchanged $\beta''$-alumina as the catalyst, said metal being capable of undergoing a change in oxidation state.

2. The novel fuel cell of claim 1 wherein the metal is a transition metal.

3. The novel fuel cell of claim 2 wherein the transition metal is Fe(II), Fe(III), Mn(II), Cr(II), Cr(III), Co(II), Cu(II) or Cu(I).

4. The novel fuel cell of claim 2 wherein the expendable component is methane.

5. The novel fuel cell of claim 2 wherein the transition metal is Fe(II).

6. The novel fuel cell of claim 2 wherein the transition metal is Fe(III).

7. The novel fuel cell of claim 2 wherein the transition metal is Mn(II).

8. The novel fuel cell of claim 2 wherein the transition metal is Cr(II).

9. The novel fuel cell of claim 2 wherein the transition metal is Cr(III).

10. The novel fuel cell of claim 2 wherein the transition metal is Co(II).

11. The novel fuel cell of claim 2 wherein the transition metal is Cu(II).

12. The novel fuel cell of claim 2 wherein the transition metal is Cu(I).

13. The novel fuel cell of claim 2 wherein only the anode is a transition metal exchanged $\beta''$-alumina.

14. The novel fuel cell of claim 2 wherein only the anode and cathode are a transition metal exchanged $\beta''$-alumina.

15. The novel fuel cell of claim 2 wherein the anode, cathode and electrolyte are each a transition metal exchanged $\beta''$-alumina.

16. The novel fuel cell of claim 1 wherein said hydrocarbons contain from 1 to about 10 carbon atoms.

* * * * *